United States Patent
Lebas et al.

(10) Patent No.: US 6,957,539 B2
(45) Date of Patent: Oct. 25, 2005

(54) POWER GENERATOR WITH LOW $CO_2$ EMISSIONS AND ASSOCIATED METHOD

(75) Inventors: Etienne Lebas, Seyssuel (FR); Alexandre Rojey, Rueil Malmaison (FR); Gérard Martin, Genis Laval (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/480,165

(22) PCT Filed: Jun. 11, 2002

(86) PCT No.: PCT/FR02/01998

§ 371 (c)(1),
(2), (4) Date: Dec. 11, 2003

(87) PCT Pub. No.: WO02/103176

PCT Pub. Date: Dec. 27, 2002

(65) Prior Publication Data

US 2004/0170935 A1 Sep. 2, 2004

(30) Foreign Application Priority Data

Jun. 14, 2001 (FR) .......................................... 01 08000

(51) Int. Cl.[7] ................................................ F02C 1/00
(52) U.S. Cl. ........................ 60/772; 60/791; 60/39.17; 60/39.183; 60/39.52
(58) Field of Search ...................... 60/772, 791, 39.17, 60/39.181, 39.182, 39.183, 39.19, 39.5, 39.52, 39.55

(56) References Cited

U.S. PATENT DOCUMENTS

| | | | | |
|---|---|---|---|---|
| 4,434,613 A | * | 3/1984 | Stahl | 60/784 |
| 4,528,811 A | * | 7/1985 | Stahl | 60/784 |
| 4,974,412 A | * | 12/1990 | Schneider | 60/39.12 |
| 5,175,995 A | | 1/1993 | Pak | |
| 5,388,395 A | * | 2/1995 | Scharpf et al. | 60/781 |
| 5,474,441 A | * | 12/1995 | Farrauto et al. | 431/7 |
| 5,505,052 A | * | 4/1996 | Ekins et al. | 62/643 |
| 5,832,712 A | * | 11/1998 | Rønning et al. | 60/783 |
| 6,209,307 B1 | * | 4/2001 | Hartman | 60/780 |
| 6,256,976 B1 | * | 7/2001 | Kataoka et al. | 60/775 |
| 6,622,470 B2 | * | 9/2003 | Viteri et al. | 60/39.52 |
| 6,637,183 B2 | * | 10/2003 | Viteri et al. | 60/39.182 |
| 6,655,150 B1 | * | 12/2003 | Åsen et al. | 60/772 |

FOREIGN PATENT DOCUMENTS

| | | |
|---|---|---|
| DE | 19728151 | 1/1999 |
| EP | 0744987 | 12/1996 |
| WO | 9707329 | 2/1997 |

* cited by examiner

Primary Examiner—William H. Rodriguez
(74) Attorney, Agent, or Firm—Antonelli, Terry, Stout and Kraus, LLP

(57) ABSTRACT

The invention relates to a method for decreasing the level of carbon dioxide present in the fumes discharged by a power generator burning a mixture of a combustive agent and of a fuel containing hydrocarbons, wherein a gaseous mixture comprising at least part of said combustive agent and at least part of said fumes is compressed, all or part of the carbon dioxide present in the compressed gaseous mixture is eliminated by absorption, a fuel is mixed with the gaseous mixture, the resulting mixture of fuel and gaseous mixture is burnt and the fumes from the combustion process are expanded. The invention also relates to a power generator for implementing said method.

16 Claims, 3 Drawing Sheets

POWER GENERATOR WITH LOW $CO_2$ EMISSIONS AND ASSOCIATED METHOD

FIELD OF THE INVENTION

The present invention relates to the field of power generators and more particularly to gas turbines.

More precisely, it describes a method and an associated device for substantially decreasing the level of carbon dioxide ($CO_2$) present in the fumes at the generator outlet prior to discharging them to the atmosphere, without substantially affecting the efficiency thereof.

It is generally admitted that the level of $CO_2$ present in the atmosphere increases regularly as a result of the increasing use, as a source of energy, of fuels referred to as <<fossil>> fuels, such as coal, liquid hydrocarbons or gaseous hydrocarbons such as natural gas.

It is also an established fact that the combustion of these fuels is mainly the cause of the greenhouse effect and of the global warming observed for several decades.

It is therefore imperative, in order to limit the greenhouse effect during the next years, to develop and to use new methods (and devices) allowing $CO_2$ recovery before final discharge thereof.

BACKGROUND OF THE INVENTION

In the field of thermal generators, a first solution consists in collecting the $CO_2$ present in the combustion fumes prior to discharging them into the atmosphere.

The methods used are generally based on cryogenics, absorption by a chemical or physical means, or on the use of membranes.

The large amounts of fumes to be processed and the low partial pressures of the $CO_2$ in said fumes, which are themselves substantially at the atmospheric pressure, explain why these solutions are however complex and costly to implement.

Other technologies have been provided more recently to limit the final $CO_2$ emissions. Examples thereof are:

conversion of the fuel to hydrogen ($H_2$) and carbon dioxide ($CO_2$) by reforming or partial oxidation prior to the combustion stage.

This method affords the advantage of increasing the total pressure and the partial pressure of the $CO_2$ in the gaseous products resulting from the reforming stage. This allows thereafter easier separation of the carbon dioxide and of the hydrogen, the hydrogen-enriched and substantially $CO_2$-free gas fraction being then burnt in a gas turbine.

Such a method is for example described in international patent applications WO 99/41,188 and WO 00/18,680.

However, a major drawback of this type of method is linked with the very energy-costly reforming stage, which consequently considerably decreases the overall energy efficiency of a plant working with such a method. Furthermore, the device taken as a whole is bulky, costly and complex to implement because it includes a reforming unit and a separation unit, as well as a thermal generator.

Preliminary separation of the molecular nitrogen ($N_2$) and of the oxygen ($O_2$) present in the combustion air upstream therefrom.

Combustion is thus carried out in the presence of substantially pure oxygen and the combustion fumes essentially contain $CO_2$ and steam. After recovery of the energy by expansion of the hot fumes, the carbon dioxide is separated from the water, part of the fumes being generally recycled to dilute the oxygen.

A method based on this principle is for example described in international patent application WO 97/07,329, but the economic feasibility of this method is however limited by the high cost of the plant intended for separation of the oxygen and of the molecular nitrogen.

Other methods have also been proposed lately.

International patent application WO 00/57,990 provides, for example, combustion with part of the air from the compressor. The fumes resulting from this combustion then pass through a $CO_2$ absorption device also working under pressure.

This method has the advantage of increasing the partial pressure of the carbon dioxide and of decreasing the total volume of the gas to be processed in the absorption unit.

However, it involves cooling of the fumes resulting from the combustion (carried out at a temperature generally above 1000° C.) to a temperature ranging between 30 and 120° C. to obtain the conditions allowing said absorption, then heating after this absorption to a temperature ranging between 800 and 900° C. through an exchanger.

Besides the technical difficulties linked with such conditions (notably the realization and the cost of such an exchanger), the overall energy efficiency of the plant is low because of the inevitable thermal losses generated by such a method and of the low temperature of the gases at the expander inlet.

Patent EP 744,987-B1 provides recirculation of part of the fumes (approximately 40%) resulting from the combustion with the combustion air, the other part being sent to a $CO_2$ absorption column.

This technique allows the level of $CO_2$ present in said fumes to be substantially increased, but this $CO_2$ content increase is however limited.

Furthermore, extraction of the $CO_2$ in the non-recycled fumes fraction is carried out at ambient pressure, therefore with a large gas volume, and it will necessarily lead to cost and space problems.

SUMMARY OF THE INVENTION

The present invention is aimed to overcome the aforementioned drawbacks by means of a method and of a power generator allowing to eliminate a large part of the $CO_2$ present in the fumes generated by the combustion chamber, in a simple and efficient way.

According to the invention, a method for decreasing the level of carbon dioxide ($CO_2$) present in the fumes discharged by a power generator burning a mixture of a combustive agent and of a fuel containing hydrocarbons is characterized in that it comprises at least the following stages:

a) compressing a gaseous mixture containing at least part of said combustive agent and at least part of said fumes, b) eliminating by absorption all or part of the $CO_2$ present in the compressed gaseous mixture, c) mixing a fuel with the gaseous mixture and burning the resulting mixture of fuel and gaseous mixture, d) expanding the fumes from the combustion process.

Advantageously, the combustive agent can be mixed with at least part of the fumes from stage d) so as to form the gaseous mixture of stage a).

Alternatively, absorption stage b) can be carried out between two successive stages of compression of the gaseous mixture.

Advantageously, absorption stage b) can be carried out at the compressor outlet.

Preferably, at least 40% of the total volume of cooled fumes can be recycled.

According to an embodiment, a catalytic combustion can be carried out in stage c).

According to another embodiment, substantially the stoichiometric amount of oxygen required for combustion can be mixed with the recycled fumes.

In the method according to the invention, the combustive agent can be air or oxygen-enriched air.

The invention also relates to a power generator burning a mixture of a combustive agent and of a fuel containing hydrocarbons and including at least one compressor with at least one compression stage, at least one combustion means and at least one expander, characterized in that it comprises carbon dioxide absorption means arranged upstream from the combustion means in relation to the direction of circulation of the fumes.

The compressor can have at least two compression stages and the absorption means can be arranged between two successive compression stages.

The absorption means can be arranged between the compressor and the combustion means.

Advantageously, the generator can comprise means for recycling at least part of the fumes upstream from the compressor.

The recycling means can be associated with heat exchange means for cooling the fumes.

The combustion means can comprise catalytic burners.

Preferably, the absorption means are selected from the group consisting of the columns using chemical solvents, columns using physical solvents, columns using hybrid (mixed) solvents, cryogenic distillation, membranes, molecular-sieve adsorption techniques.

BRIEF DESCRIPTION OF THE FIGURES

Other features and advantages of the present invention will be clear from reading the description hereafter of a non limitative example, with reference to the accompanying figures wherein similar elements are designated by the same reference numbers and wherein.

DETAILED DESCRIPTION

Figure 1:
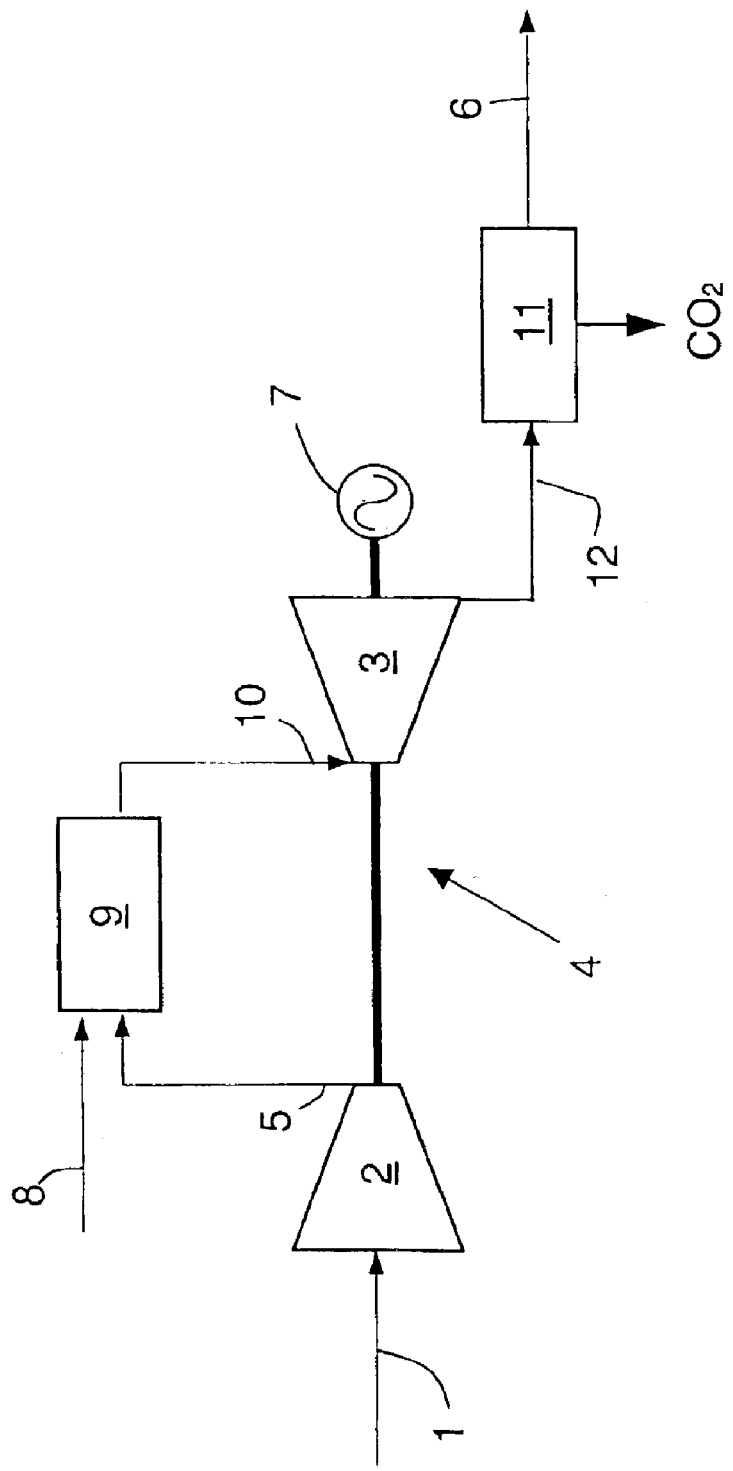
FIG. 1 illustrates, according to the prior art, the pattern of an electric generator including a gas turbine and a device for collecting the $CO_2$ contained in the combustion fumes from said turbine.

FIG. 1 is representative of a plant according to the prior art comprising a power generator of turbine type wherein a liquid or gaseous hydrocarbon-containing fuel (natural gas in the examples mentioned hereafter) is burnt, followed by a $CO_2$ absorption device.

This generator consists of a gas turbine 4 including a compressor 2 comprising at least one compression stage, a combustion chamber 9 and an expander 3 supplying the enrgy required for driving compressor 2 and an alternator 7.

The combustive agent, air in the present case, is fed into compressor 2 through an inlet 1, and it is compressed therein. This compressed air is then fed through a line 5 into combustion chamber 9 and it allows combustion of a gaseous fuel delivered through a line 8. The hot gases or fumes resulting from this combustion flow through a connection 10 into expander 3. At the outlet thereof, the fumes are conveyed through a line 12 into a known $CO_2$ absorption device 11. Once freed of a substantial part of this $CO_2$, the fumes are discharged into the atmosphere through a means 6 whereas the $CO_2$ is collected and processed by any known means.

In general, it is common practice to recover at least part of the heat of said fumes in a steam generator for example for use on a co-generation or combined cycle basis. It is also possible to heat the compressed air passing through line 5 by heat exchange with said fumes.

As mentioned above, $CO_2$ absorption has to be carried out, according to this method, at atmospheric pressure on large volumes of fumes with a low $CO_2$ content and it therefore requires bulky and costly equipments.

Figure 2:
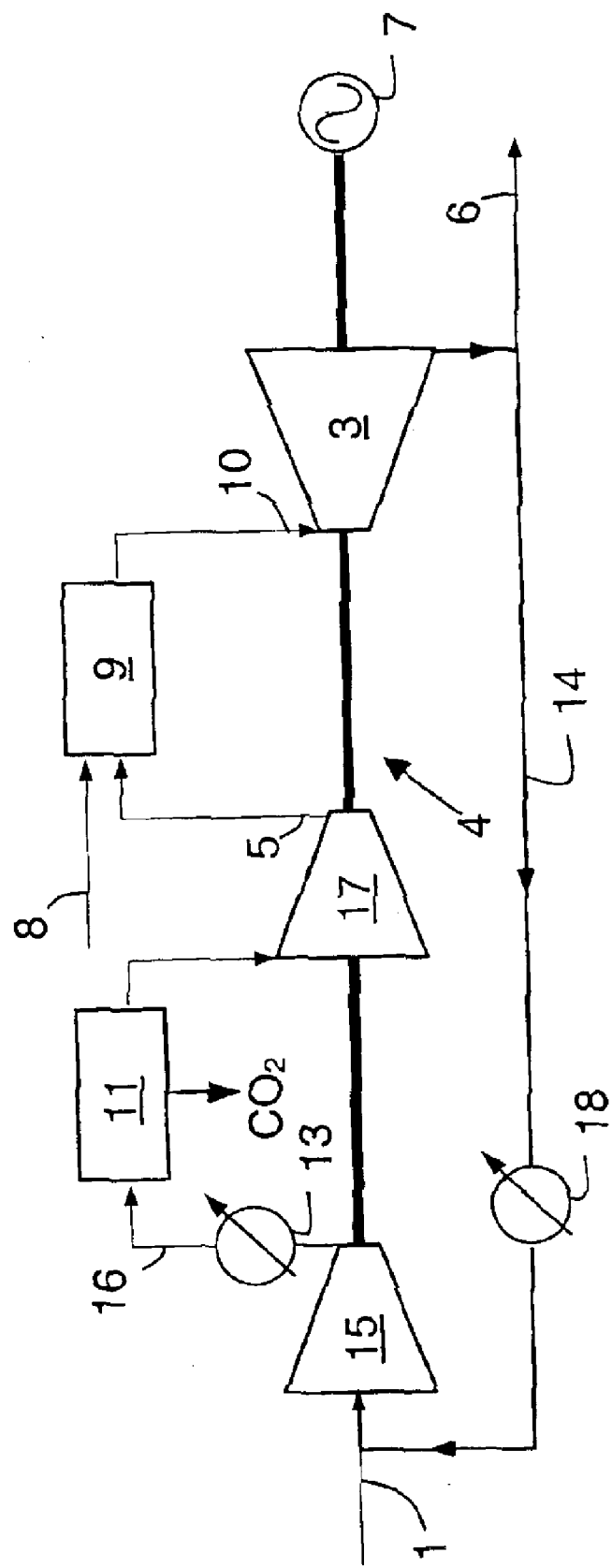
FIG. 2 illustrates a first embodiment of a generator including, according to the invention, a $CO_2$ collection device.

FIG. 2 illustrates a first embodiment of the invention wherein turbine 4 comprises a compressor having at least two compression stages 15 and 17, a combustion chamber 9 supplied with fuel through line 8 and an expander 3 providing the energy required for driving the compressor and an alternator 7.

A gaseous mixture containing a combustive agent such as air and part of the fumes resulting from the combustion in chamber 9 flows in through inlet 1 and it is compressed by first compression stage 15 to a pressure ranging between about 2 and about 10 bars, then it passes into a line 16 and flows through a $CO_2$ absorption device 11.

In the sense of the present invention, the $CO_2$ absorption device can be based on any known method and it will therefore not be described hereafter.

For example, it can be based on the use of chemical solvents (amines or potassium carbonate) with a device comparable to the device described in patent EP 744,987-B1 or in international patent application WO 00/57,990, on the use of physical solvents, of hybrid (mixed) solvents, on the use of cryogenic distillation, membranes, and more particularly gas permeation membranes, or on the use of adsorption techniques, molecular sieve adsorption for example. These methods are for example described in <<Natural gas: production, processing, transport>> (A. Rojey and C. Jaffret), Editions Technip, Paris, 1997.

An exchanger 13, generally referred to by the man skilled in the art as <<intercooler>>, advantageously allows to decrease the temperature of the gaseous mixture from the compressor before it enters absorption device 11.

The combustive gaseous mixture freed of a substantial part of the carbon dioxide is recompressed in second compression stage 17 to a pressure generally ranging between about 10 and about 40 bars, then it is sent to combustion chamber 9 to allow combustion of the gaseous fuel introduced through line 8. The fumes generated by this combustion are sent through line 10 to expander 3. At the outlet of expander 3, a variable part of the combustion fumes is recycled through a line 14 upstream from first compression stage 15 (in the direction of circulation of the combustive agent in turbine 4) and mixed with an adjusted amount of fresh combustive agent. An exchanger 18 placed on line 14 allows the recycled fumes to be cooled to a temperature close to the temperature of the fresh combustive agent.

Without departing from the scope of the invention, it is possible to recover at least part of the heat of said fumes in a steam generator for example for use on a co-generation or combined cycle basis. It is also possible to heat the air under pressure passing through line 5 by heat exchange with said fumes.

The method and/or the device according to the invention afford the advantage of being simple, robust, efficient and economically interesting because no particular and/or costly equipment is required for the $CO_2$ absorption stage. In particular, recirculation of the fumes in turbine 4, combined with compression of the combustive agent/fumes mixture in stage 15, provides a relatively high $CO_2$ partial pressure in said mixture and a low volume of gas to be processed upstream from the combustion zone. Consequently, the present method and/or device provides a high carbon dioxide absorption efficiency at a low cost and a reduced space requirement.

Figure 3:
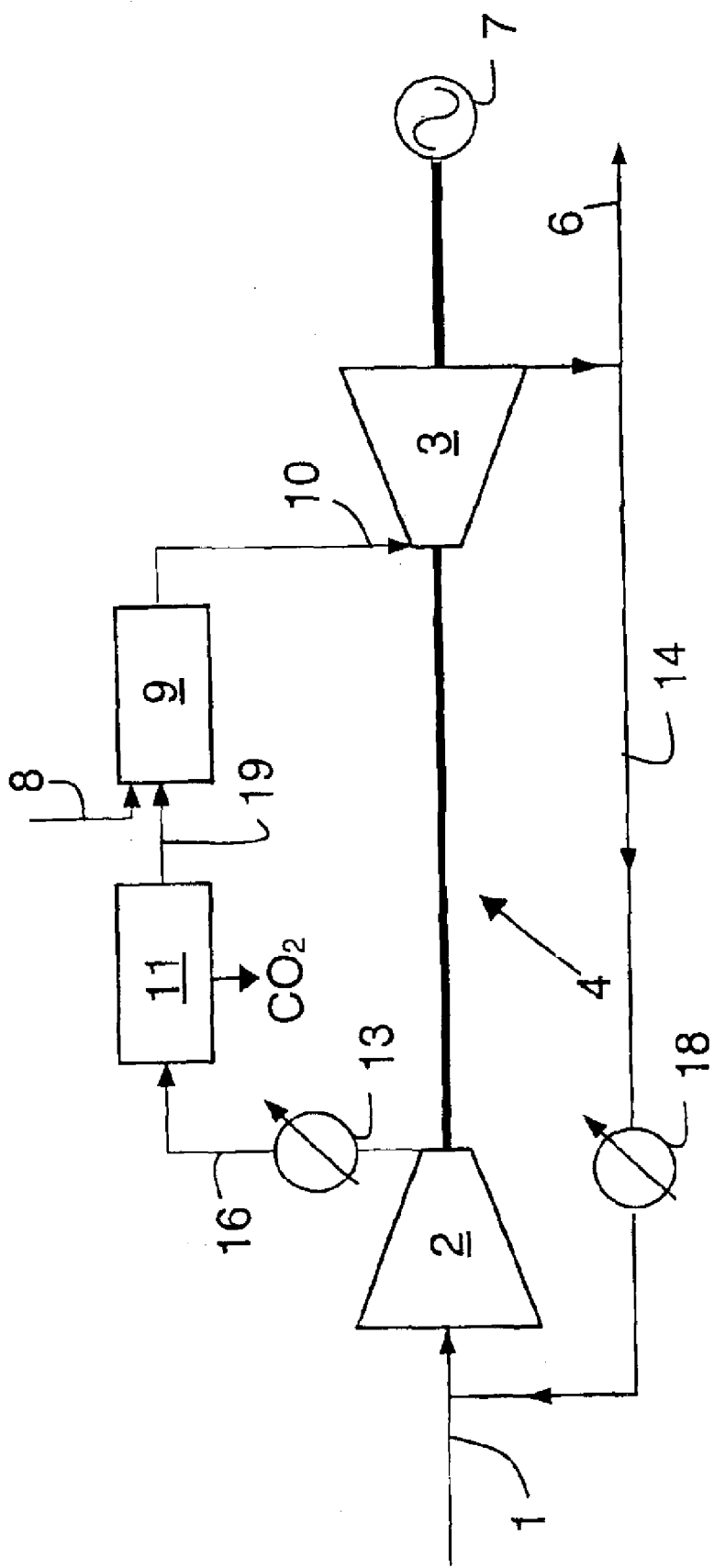
FIG. 3 illustrates a second embodiment of a generator including, according to the invention, a $CO_2$ collection device.

FIG. 3 illustrates another embodiment of the invention wherein extraction of the $CO_2$ on the mixture consisting of the combustive agent and of the recycled fumes by means of device 11 is carried out at the outlet of compressor 2, with one compression stage here, and prior to combustion in chamber 9. Transfer of the gaseous mixture substantially freed of $CO_2$ between absorption device 11 and combustion chamber 9 is provided by a connection 19.

As in the example described in connection with FIG. 2, the fumes from the combustion chamber reach turbine 3 through line 10 and, at the outlet of expander 3, a variable part of the combustion fumes is recycled through line 14 upstream from compressor 2 so as to be mixed with an adjusted amount of fresh combustive agent. An exchanger 18 arranged on line 14 also allows to cool the recycled fumes to a temperature close to the temperature of the fresh combustive agent.

As mentioned above, it is also possible to recover at least part of the heat of said fumes in a steam generator for example for use on a co-generation or combined cycle basis. It is also possible to heat the air under pressure passing through line 19 by heat exchange with said fumes.

Without departing from the scope of the invention, several operating modes of the method and/or of the device according to the invention are possible:

air is used as the combustive agent at inlet 1 of the compressor. Thus, according to the proportion of fumes recycled through line 14, either a conventional combustion chamber comprising a flame burner if the amount of oxygen in the air/recycled fumes mixture is relatively high or a catalytic chamber if said amount is relatively low is used.

Simulations carried out by the applicant have shown that, if the recycle ratio of the fumes through line 14 is above about 40% of the total gas volume, the amount of oxygen in the air/recycled fumes mixture at the inlet of combustion zone 11 is not sufficient to provide stability of the combustion flame.

According to an advantageous embodiment, a chamber comprising a catalytic combustion burner of a known type is used to provide a stable combustion, preferably of monolith type and such as described in European patent applications EP-784,603, EP-784,187 or EP-784,188.

oxygen-enriched air generally comprising between 22% and 95% by mole of oxygen, often about 40 to about 90% and preferably between 60 and 90% by mole of oxygen is used as the combustive agent. The combustion chamber also comprises in this case a catalytic combustion chamber.

Using a catalytic combustion chamber advantageously allows to recycle and therefore to process a large majority of the fumes resulting from combustion. In this case, the fumes recycle ratio usually ranges between about 40% and about 99%, preferably between 70% and 99%.

Without departing from the scope of the invention, it is possible to apply the same principles and devices to a recuperative gas turbine cycle known to the man skilled in the art.

The applicant has carried out tests whose results are as follows:

EXAMPLE 1
(According to the Prior Art):

A device similar to the device described in connection with FIG. 1 is used in this example.

According to the simulation carried out by the applicant, the air is fed into inlet 1 with a flow rate of 65900 kmol/h (kilomoles per hour). The fuel consists of natural gas fed into chamber 9 through line 8 with a flow rate of 2150 kmol/h. At the inlet of expander 3, the temperature of the fumes is close to 1300° C.

At the expander outlet, and at the inlet of absorption device 11, the molar flow rate of the fumes to be processed is 68000 kmol/h and the flow rate of the carbon dioxide contained in said fumes is 2150 kmol/h. The electric efficiency of the gas turbine (in relation to the net calorific value NCV of the fuel) calculated for this embodiment, without carbon dioxide absorption stage, is about 32% for an electric power of 163 MWatts. The $CO_2$ emissions are 581 grams $CO_2$ per kWh (kilowatthour).

EXAMPLE 2
(According to the Invention):

A device similar to the device described in connection with FIG. 2 is used in this example.

According to the simulation performed by the applicant, the air flows in through inlet 1 with a flow rate of 21970 kmol/h (kilomoles per hour). The fuel consists of natural gas fed into chamber 9 through line 8 with a flow rate of 2306 kmol/h. The total air introduced is mixed upstream from the compressor with recycled cold fumes coming from exchanger 18, whose flow rate is 28160 kmol/h (corresponding to a recycle ratio of about 60% of the fumes).

The mixture is compressed to 10 bars between two successive stages of the compressor. The compressed mixture is cooled to 50° C., then it passes into absorption means 11 which is a column wherein a countercurrent liquid circulation of amine and of the compressed gas is carried out. The column is so dimensioned that 90% of the $CO_2$ contained in the mixture is absorbed. The mixture freed of most of the $CO_2$ it contained is then recompressed in the next compression stage 17, then mixed with the fuel and sent substantially in its entirety, i.e. in proportions above 98%, into combustion chamber 9 equipped with catalytic burners.

The fumes, whose temperature is approximately 1300° C., are fed into the inlet of expander 3. At the outlet of the expander, the molar flow rate of the processed fumes is 48470 kmol/h, 60% thereof being recycled to the compressor. The flow rate of the carbon dioxide discharged is, in this case, about 1026 kmol/h. The electric efficiency calculated in this embodiment is 32.2% for an electric power of 180.2 MWatts. The $CO_2$ emissions are 249 grams $CO_2$ per kWh (kilowatthour).

EXAMPLE 3
(According to the Invention):

A device similar to the device described in connection with FIG. 2 is used in this example. The experimental conditions are the same as those described in example 2, but in example 3 oxygen-enriched air is used (82% by mole of oxygen) and fed into inlet 1 with a flow rate of 5610 kmol/h. The fuel consists of natural gas fed into chamber 9 through line 8 with a flow rate of 2306 kmol/h. The total air introduced is mixed upstream from the compressor with recycled cold fumes whose flow rate is 49010 kmol/h coming from exchanger 18 (corresponding to a recycle ratio of about 98% of the fumes).

At the expander outlet, the molar ratio of the processed fumes is 50180 kmol/h, 98% thereof being recycled to the compressor. The discharged carbon dioxide flow rate is in this case about 59 kmol/h. The electric efficiency calculated in this embodiment is 3.15% for an electric power of 179.2 MWatts. The $CO_2$ emissions are 15 grams per kWh (kilowatthour).

The table hereafter summarizes the results obtained for the three examples described above.

| Example | Efficiency (%) | Electric power (MWatts) | $CO_2$ discharged ($g_{CO2}$/kWh) |
|---------|----------------|-------------------------|-----------------------------------|
| 1       | 32             | 163                     | 581                               |
| 2       | 32.2           | 180.2                   | 249                               |
| 3       | 31.5           | 179.2                   | 15                                |

The invention thus allows the calculated electric efficiency of a power generator to be maintained at a substantially constant level while considerably decreasing carbon dioxide emissions.

What is claimed is:

1. A method for decreasing the level of carbon dioxide ($CO_2$) present in the fumes discharged by a power generator burning a mixture of a combustive agent and of a fuel containing hydrocarbons, characterized in that it comprises at least the following stages:
   a) compressing a gaseous mixture containing at least part of said combustive agent and at least part of said fumes,
   b) eliminating by absorption all or part of the $CO_2$ present in the compressed gaseous mixture,
   c) mixing a fuel with the gaseous mixture and burning the resulting mixture of fuel and gaseous mixture,
   d) expanding the fumes from the combustion process.

2. A method as claimed in claim 1, wherein at least part of the fumes from stage d) is mixed with the combustive agent so as to form the gaseous mixture of stage a).

3. A method as claimed in claim 1, wherein absorption stage b) is carried out between two successive gaseous mixture compression stages.

4. A method as claimed in claim 1, wherein absorption stage b) is carried out at the compressor outlet.

5. A method as claimed in claim 1, wherein at least 40% of the total volume of the cooled fumes is recycled.

6. A method as claimed in claim 1, wherein a catalytic combustion is carried out in stage c).

7. A method as claimed in claim 5, wherein substantially the stoichiometric oxygen amount required for combustion is mixed with the recycled fumes.

8. A method as claimed in claim 1, wherein the combustive agent is oxygen-enriched air.

9. A method as claimed in claim 1, wherein the combustive agent is air.

10. A power generator burning a mixture of a combustive agent and of a fuel containing hydrocarbons and including at least one compressor with at least one compression stage, at least one combustion means and at least one expander, characterized in that at least a part of fumes from an outlet of the at least one expander are circulated to upstream of the at least one combustion means, and in that the power generator further comprises carbon dioxide absorption means arranged upstream from the at least one combustion means in relation to the direction of circulation of the fumes.

11. A generator as claimed in claim 10, wherein the at least one compressor comprises at least two compression stages and wherein the absorption means are arranged between two successive compression stages.

12. A generator as claimed in claim 10, wherein the absorption means are arranged between the at least one compressor and the at least one combustion means.

13. A generator as claimed in claim 10, further comprising means for recycling at least part of the fumes from the outlet of the at least one expander to a position upstream from the at least one compressor.

14. A generator as claimed in claim 13, wherein the recycling means are associated with heat exchange means for cooling the fumes.

15. A generator as claimed in claim 10, wherein the at least one combustion means comprises catalytic burners.

16. A generator as claimed in claim 10, wherein the absorption means are selected from the group consisting of the columns using chemical solvents, columns using physical solvents, columns using hybrid (mixed) solvents, cryogenic distillation, membranes, molecular-sieve adsorption techniques.

* * * * *